(12) United States Patent
Liu

(10) Patent No.: US 9,506,606 B1
(45) Date of Patent: Nov. 29, 2016

(54) FLUID DIVERSION DEVICE

(71) Applicant: FITOK Incorporated, Shenzhen (CN)

(72) Inventor: Chao Liu, Shenzhen (CN)

(73) Assignee: FITOK INCORPORATED, Guangdong (CN)

( * ) Notice: Subject to any disclaimer, the term of this patent is extended or adjusted under 35 U.S.C. 154(b) by 0 days.

(21) Appl. No.: 14/744,028

(22) Filed: Jun. 19, 2015

(30) Foreign Application Priority Data

May 28, 2015 (CN) .......................... 2015 1 0283659

(51) Int. Cl.
| | |
|---|---|
| F16K 11/10 | (2006.01) |
| F17D 3/01 | (2006.01) |
| F16K 31/60 | (2006.01) |
| F16K 35/04 | (2006.01) |
| F16L 15/08 | (2006.01) |
| F16L 55/07 | (2006.01) |
| F16L 41/02 | (2006.01) |

(52) U.S. Cl.
CPC .................. *F17D 3/01* (2013.01); *F16K 31/60* (2013.01); *F16K 35/04* (2013.01); *F16L 15/08* (2013.01); *F16L 41/02* (2013.01); *F16L 55/07* (2013.01)

(58) Field of Classification Search
USPC .................................. 137/883; 251/143, 144
See application file for complete search history.

(56) References Cited

U.S. PATENT DOCUMENTS

| 1,786,750 A | * | 12/1930 | Hasselquist | ........ F01M 11/0408 184/1.5 |
| 4,540,158 A | * | 9/1985 | Jungen | ................ F16K 27/0263 137/343 |
| 4,784,174 A | * | 11/1988 | Ryan | ....................... F16L 55/07 137/15.17 |
| 6,631,736 B2 | * | 10/2003 | Seitz | .................. F15B 13/0814 137/883 |
| 7,370,673 B2 | * | 5/2008 | Trumbower | ............ F25B 45/00 137/883 |

FOREIGN PATENT DOCUMENTS

CN         102788246         11/2012

* cited by examiner

*Primary Examiner* — John Fox
(74) *Attorney, Agent, or Firm* — Ladas & Parry, LLP

(57) ABSTRACT

A fluid diversion device utilizes a branch pipeline control device to realize control of a branch pipeline, wherein a base of the branch pipeline control device has a flow passage opening communicated with a main accommodation body in a sealing manner, and a first mounting hole and a second mounting hole for being communicated with the branch pipeline. A driving part in a valve cap assembly is utilized to drive a valve core assembly to open and close the flow passage opening. In such a configuration, flush sealing surfaces do not need to be machined on the main accommodation body, the machining technology is simple, and it is not necessary for the branch pipeline control device to machine the main accommodation body (including a main pipeline and a container, etc.) into a columnar platform, which greatly reduces the requirement for cavity wall thickness and machining difficulty, as well as reduces the cost. Meanwhile, the on/off control can be realized without installing a valve since the branch pipeline control device is directly integrated with a control unit.

15 Claims, 8 Drawing Sheets ical Field
FLUID DIVERSION DEVICE

CROSS-REFERENCE TO RELATED APPLICATIONS

This application claims the priority of Chinese Patent Application No. 201510283659.7, filed on May 28, 2015 in the Chinese Patent Office, the disclosure of which is incorporated in its entirety herein by reference.

BACKGROUND

Technical Field

The present invention relates to the field of pipeline connectors, in particular to a device for fluid connection from a main pipeline or a container to a branch pipeline, and a fluid diversion device using the connection device.

Related Art

The liquid and gas delivery pipeline is widely used in the industrial fields such as oil, chemical industry, power generation and pharmacy. In production application, fluid in the main pipeline or container often needs to be connected to multiple branch pipelines for distributing the fluid to meet the industrial requirement, and achieve the objects such as sample detection, fluid performance index test, and heat dissipation in circulation. The gas source distributor is most widely used in the industrial field, the Chinese patent CN102788246A discloses a gas source distributor which is a middle bridge for the connection between a start-up instrument and a gas main pipe in centralized installation, and is convenient for controlling the on/off of each pipeline. The pipe body of the gas source distributor is generally narrow in space, the connection of a branch pipe can only be realized by installing at a single external side, this conventional structure as shown in FIG. 1 is usually adopted for the branch pipeline joint of the gas source distributor, in this structure, a hole needs to be drilled in a main pipe body 100 by a special drill bit, such that the main pipe body 100 is subjected to plastic deformation under the friction and extrusion of the drill bit, and a columnar platform 101 is formed, female threads 102 are formed on the columnar platform 101 through milling and thread tapping, and meshed with male threads 202 of the joint 200 having a central hole 201, and the sealing for thread meshing gaps is formed after a sealing element 500 annularly sleeved on the joint 200 is compressed by a gasket 400 and a nut 300. The milled radial plane of the columnar platform 101 is a sealing face which is convenient for the sealing of the sealing element 500. In such conventional joint of FIG. 1, the connection strength of the female threads 102 to the joint 200 can only be guaranteed with a sufficient length, which requires a wall thickness T of the pipe body 100 to be great enough to form the columnar platform 101 with a sufficient height to satisfy the requirements for machining the radial plane for sealing and guaranteeing the connection strength, and the requirement for the size T is generally much higher than the requirement of the fluid pressure of the pipe body 100 for the wall thickness, which leads to heavy weight of the pipe body 100, and thus improvement is needed.

SUMMARY

The application provides a novel fluid diversion device.
The fluid diversion device provided by the application includes:
a main accommodation body, including an accommodation cavity; and
at least one branch pipeline control device mounted on the main accommodation body and including:
a base, including a base cavity provided with a flow passage opening for being communicated with the accommodation cavity in a sealing manner and a first mounting hole and a second mounting hole for being communicated with the branch pipeline;
a valve cap assembly, including a valve cap provided a central cavity, a valve core assembly for controlling on/off of the flow passage opening and a driving part for driving movement of the valve core assembly, the valve cap being linked with the base in a sealing manner through the second mounting hole; the valve core assembly including a valve rod, the valve rod being provided through the central cavity and extending out of the valve cap to be connected to the driving part, and driven by the driving part to open and close the flow passage opening; and
a joint, having a central hole, an internal connection part for being connected to the first mounting hole and an external connection part for external connection, the internal connection part being connected to the first mounting hole in a sealing manner.

As a further improvement of the fluid diversion device, the base is fixedly arranged inside the main accommodation cavity, the valve cap assembly and the joint are fixedly arranged outside the main accommodation cavity, and the main accommodation cavity is provided with a first connecting hole corresponding to the first mounting hole and a second connecting hole corresponding to the second mounting hole; the internal connection part extends into the first connecting hole from the exterior of the main accommodation body to be linked with the first mounting hole in a sealing manner, or the first mounting hole of the base extends out of the first connecting hole to be connected to the internal connection part in a sealing manner, allowing the communication between the central hole and the base cavity; one end of the valve cap passes through the second connecting hole from the exterior of the main accommodation body to be fixed with the second mounting hole, or the second mounting hole extends out of the second connecting hole to be fixed with the valve cap.

As a further improvement of the fluid diversion device, the driving part is a handle that is connected to the valve rod through a pin shaft and abuts against one end of the valve cap away from the base, and the outer edge of the handle for abutting against the valve cap is provided with a first outer edge portion and a second outer edge portion, and the distance from the first outer edge portion to the pin shaft is greater than the distance from the second outer edge portion to the pin shaft; the valve core assembly comprises a spring that is arranged between the inner wall of the central cavity and the valve rod, and the resilience of the spring drives the valve rod to move towards the flow passage opening; when the first outer edge portion on the handle abuts against the valve cap, the flow passage opening is opened by the valve rod; and when the second outer edge portion on the handle abuts against the valve cap, the flow passage opening is closed by the valve rod.

As a further improvement of the fluid diversion device, the valve cap assembly further comprises a lock bracket that is fixedly linked with the valve cap and provided with a blocker for blocking the rotation of the handle, and the blocker is positioned on a rotation path of the handle and detachably mounted on the lock bracket.

As a further improvement of the fluid diversion device, the central cavity is of a diameter reducing structure that has a small-diameter end and a large-diameter end, and the valve rod passes through the small-diameter end and then extends out of the valve cap to be connected to the driving part.

As a further improvement of the fluid diversion device, the valve cap and the internal connection part are provided with external threads, the part of the internal connection part that is provided with the external threads passes through the first connecting hole to be in threaded connection with the first mounting hole, the part of the valve cap that is provided with the external threads passes through the second connecting hole to be in threaded connection with the second mounting hole, and the base, the valve cap and the joint abut against the main accommodation body from the inner side and the outer side of the main accommodation body for fixation.

As a further improvement of the fluid diversion device, the intersection of the valve cap, the base and the main accommodation body is provided with a sealing ring and/or coated with a sealant for sealing.

As a further improvement of the fluid diversion device, the intersection of the joint, the base and the main accommodation body is provided with a sealing ring and/or coated with a sealant for sealing.

As a further improvement of the fluid diversion device, the branch pipeline control device further comprises a backing plate, the backing plate has a first plate hole corresponding to the first connecting hole and a second plate hole corresponding to the second connecting hole, and the backing plate is compressed on the outer wall of the main accommodation body by the valve cap and the joint.

As a further improvement of the fluid diversion device, the sides of the first plate hole and the second plate hole which face the outer wall of the main accommodation body are designed to be in the shape of countersinks, and a first outer sealing ring and a second outer sealing ring are arranged in the countersinks.

As a further improvement of the fluid diversion device, one end of the valve rod proximate to the flow passage opening is embedded with a valve head for improving the sealing property of the flow passage opening.

The application has the following beneficial effects:

The fluid diversion device provided by the application utilizes a branch pipeline control device to realize control of a branch pipeline, wherein a base of the branch pipeline control device has a flow passage opening communicated with a main accommodation body in a sealing manner, as well as a first mounting hole and a second mounting hole for being communicated with the branch pipeline. A driving part in a valve cap assembly can be utilized to drive a valve core assembly to open and close the flow passage opening. In such a configuration, flush sealing surfaces do not need to be machined on the main accommodation body, the machining technology is simple, and it is not necessary for the branch pipeline control device to machine the main accommodation body (including a main pipeline and a container, etc.) into a columnar platform, which greatly reduces the requirement for cavity wall thickness and machining difficulty, as well as reduces the cost. Meanwhile, the on/off control can be realized without mounting valves since the branch pipeline control device is directly integrated with a control unit.

DETAILED DESCRIPTION

Figure 1:
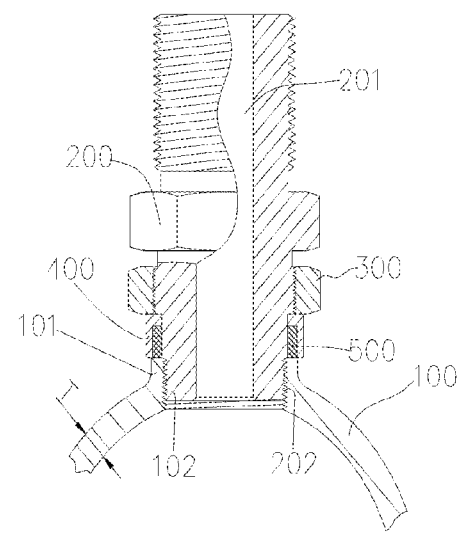
FIG. 1 is a sectional view of an existing branch pipeline joint.
Figure 2:
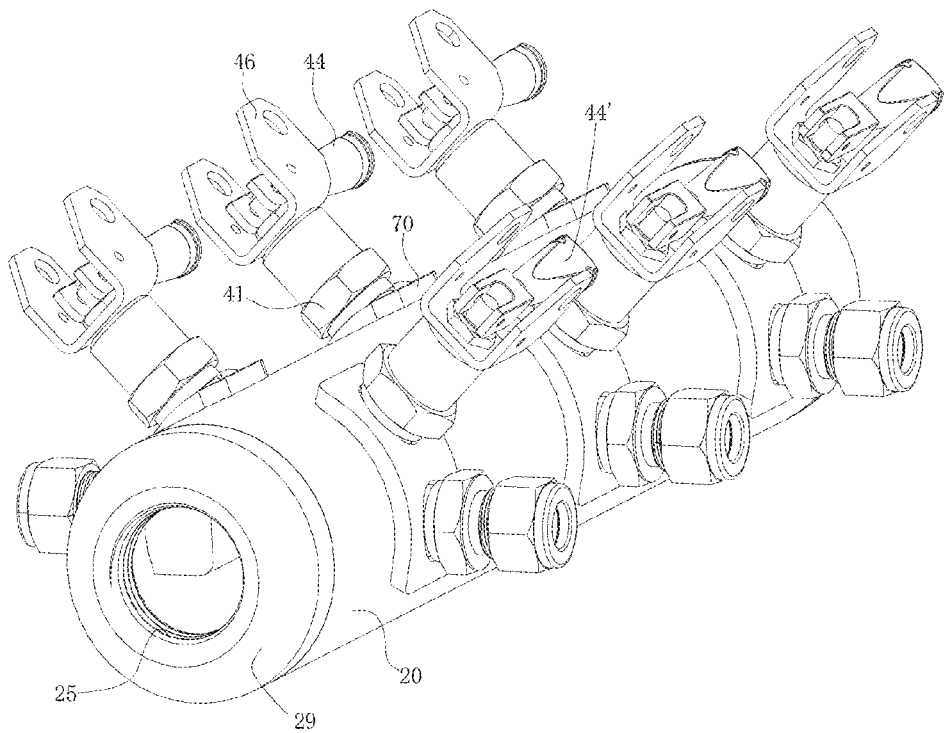
FIG. 2 is a perspective view of a fluid diversion device.

The present invention is described below through detailed implementation manners and the accompanying drawings. The application can be implemented in various different forms, not limited to the implementation manners described in the embodiments. The purpose of providing the following detailed implementation manners is to facilitate more apparent and thorough understanding of the disclosure of the application, wherein the words for indicating positions such as upper, lower, left and right, etc. are only for positions of the illustrated structure in corresponding drawings.

However, those skilled in the art may realize that one or more specific details described herein can be omitted, or other methods, assemblies or materials can also be adopted. In some examples, some implementation manners are not described or not described in detail.

In addition, technical features and technical solutions described herein can also be combined in any suitable manner in one or more embodiments.

The application provides a fluid diversion device, which comprises a main accommodation body and at least one branch pipeline control device, and this branch pipeline control device is arranged on the main accommodation body.

The main accommodation body shown in this embodiment may be either a container, or a main pipeline.

Wherein, the branch pipeline control device comprises a base, a valve cap assembly and a joint.

The base comprises a base cavity which is provided with a flow passage opening for being communicated with the main accommodation body in a sealing manner, as well as a first mounting hole and a second mounting hole for being communicated with the branch pipeline. Wherein the base can be arranged inside the main accommodation body, or outside the main accommodation body. The base and the main accommodation body can be sealed by means of sealing rings, sealants or welding.

The valve cap assembly comprises a valve cap with a central cavity, a valve core assembly for controlling the on/off of the flow passage opening and a driving part for driving the movement of the valve core assembly. The valve cap is linked with the base via the second mounting hole in a sealing manner.

The valve core assembly comprises a valve rod which is arranged in the central cavity in a penetrating manner and extends out from a valve cap to be connected to the driving part, and is driven by the driving part to open and close the flow passage opening.

As a driving part, it can be implemented manually, or driven by adopting power mechanisms such as a cylinder or an electric motor.

The joint has a central hole, an internal connection part for being connected to the first mounting hole and an external connection part for external connection, wherein the internal connection part is in sealing connection with the first mounting hole.

There is no need to machine flush sealing surfaces on the main accommodation body in the structure shown in the embodiment, the machining technology is simple, and the branch pipeline control device does not need to machine the main accommodation body (comprising a main pipeline and a container, etc.) into a columnar platform, which greatly reduces the requirement for the cavity wall thickness and machining difficulty, as well as reduces the cost. Meanwhile, the on/off control can be realized without installing a valve since the branch pipeline control device is directly integrated with a control unit.

Embodiment 1

Embodiment 1 provides a fluid diversion device.

With reference to FIG. 2, FIG. 3, FIG. 4 and FIG. 5, the fluid diversion device comprises a main pipeline (used as a main accommodation body) for accommodating or receiving fluid, and 6 branch pipeline control devices (one or above) which penetrate through the main pipeline and are mounted on the main pipeline.

The main pipeline comprises a pipe body 20 as well as a front end cover 29 and a rear end cover 28 which are welded on the pipe body 20, the pipe body 20 is in the shape of a circular pipe, 12 circular holes are formed in the surface, a main passage interface 25 is formed in the front end cover 29, and a secondary interface 26 is formed in the rear end cover 28.

The branch pipeline control device comprises a base 30, a valve cap assembly 40, a joint 50 and a spacer 70.

Figure 5:
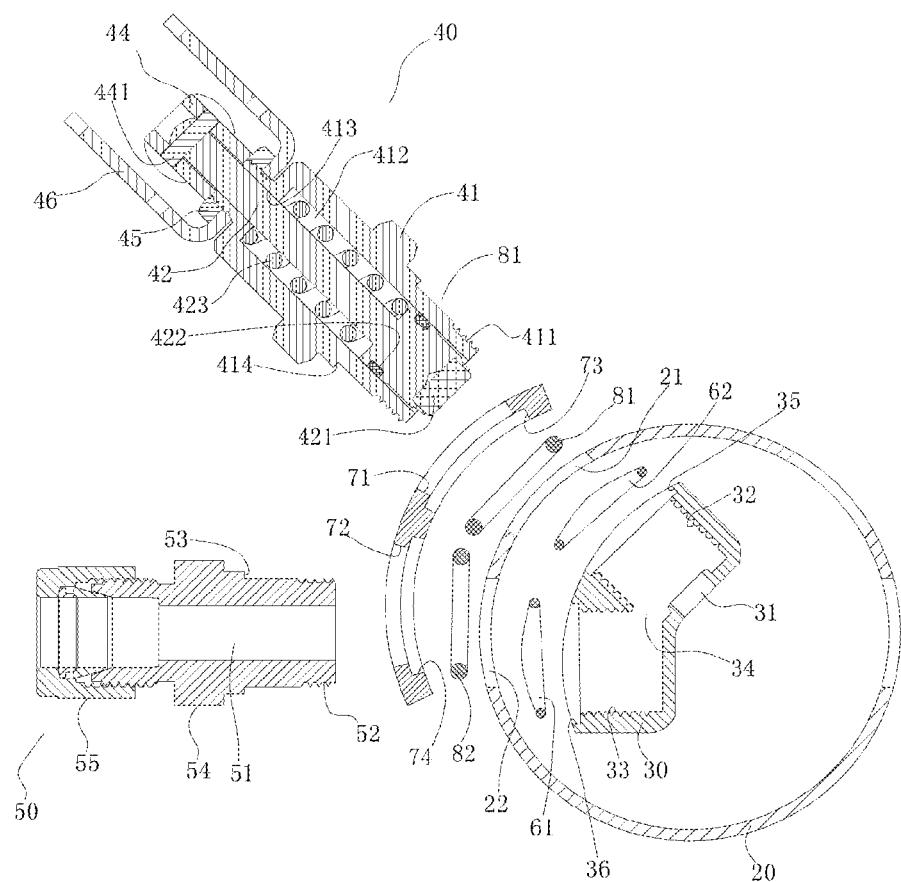
FIG. 5 is an exploded view of FIG. 4.
Figure 6:
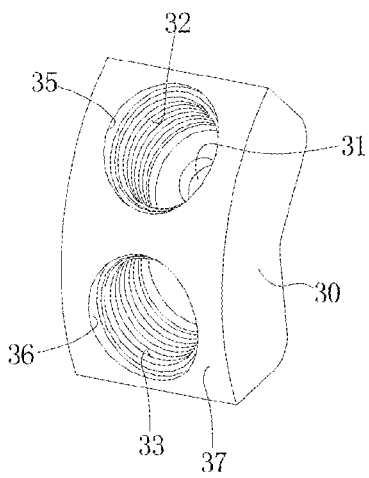
FIG. 6 is a perspective view of a base.

With reference to FIG. 5 and FIG. 6, the base 30 is provided with a flow passage opening 31, and a supporting surface 37 with a substantially identical shape with the inner wall of the pipe body 20, a second mounting hole 32 for mounting the valve cap assembly 40 and a first mounting hole 33 for mounting the joint 50 are formed in the supporting surface 37, the first mounting hole 33 and the second mounting hole 32 penetrate through the interior of the base to form a base cavity 34, and the flow passage opening 31 is communicated with the base cavity 34.

Figure 4:
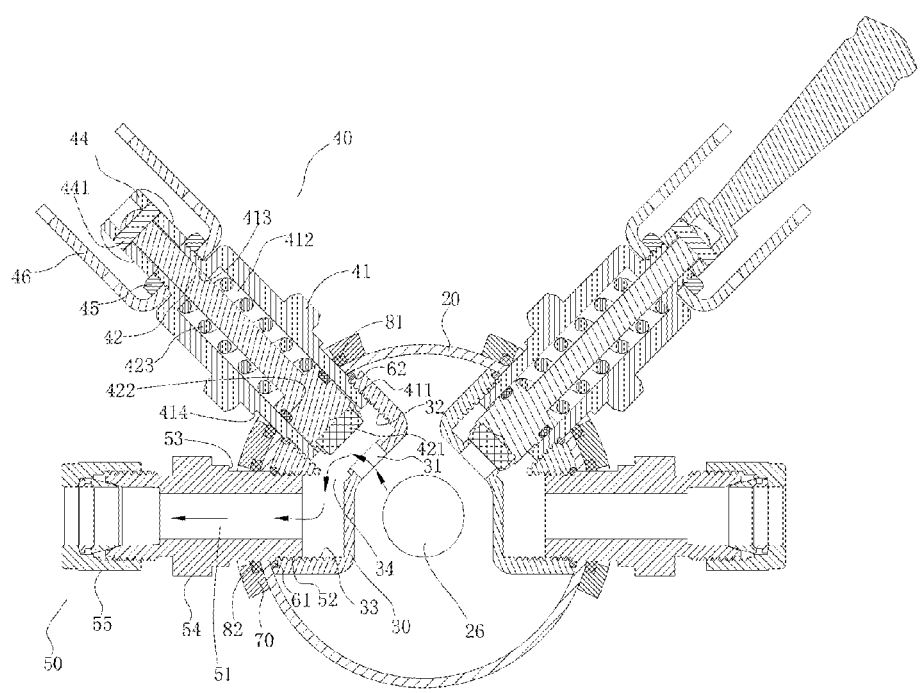
FIG. 4 is an A-A sectional view of FIG. 3.

With reference to FIG. 4 and FIG. 5, the valve cap assembly 40 comprises a valve cap 41, a valve core assembly for controlling the on/off of the flow passage opening 31 and a handle 44 (used as the driving part of this embodiment) for driving the movement of the valve core assembly. The valve cap 41 has a central cavity 412 which is of a diameter reducing structure with a small-diameter end and a large-diameter end. The valve core assembly comprises a valve rod 42, a valve head 421 (for example, made from materials having better sealing property) embedded in the valve rod for improving the sealing property of the valve rod, an O-shaped ring 422 for improving the sealing property of the valve rod, and a spring 423 for providing a pretightening force for the valve rod 42.

The valve rod 42, the O-shaped ring 422, and the spring 423 are positioned in the central cavity 412 of the valve cap 41, and the valve rod 42 passes through the small-diameter end (i.e. a valve cap hole 413) to extend out from the valve cap 41, and is connected to the handle 44 via a pin shaft 441. The handle 44 abuts against one end of the valve cap 41 away from the base 30 (including directly abutting against the valve cap 41 itself, and abutting against components fixedly linked with the valve cap 41, for example, abutting against a nut 45), an outer edge of the handle 44 for abutting against the valve cap 41 has a first outer edge portion and a second outer edge portion, and the distance from the first outer edge portion to the pin shaft 441 is greater than the distance from the second outer edge portion to the pin shaft 441. When the first outer edge portion on the handle 44 abuts against the valve cap 41, the flow passage opening 31 is opened by the valve rod 42; and when the second outer edge portion on the handle 44 abuts against the valve cap 41, the flow passage opening 31 is closed by the valve rod 42.

In order to prevent misoperation of the handle 44, the valve cap 41 is provided with a lock bracket 46 by the nut 45, the lock bracket 46 is fixedly linked with the valve cap 41 and has a blocker for blocking rotation of the handle 44, and the blocker is positioned on a rotation path of the handle 44, and detachably mounted on the lock bracket 46.

Specifically, holes 462, 463 are formed in the lock bracket 46, and movement of the handle is limited by arranging locks, rod pieces or other blockers with blocking effects in the holes 462, 463 in a penetrating manner.

The connection and sealing of the valve cap 41 and the base 30 are achieved as follows: one end 411 of the valve cap 41 passes through a second plate hole 71 in a backing plate 70 and a second connecting hole 21 in the pipe body 20, and then is connected to the second mounting hole 32 in the base 30, and the sealing of any two of the pipe body 20, the base 30 and the valve cap 41 at their intersection is achieved through a second inner sealing ring 62 which is positioned on a second annular table 35 of the second mounting hole 32.

In order to further improve the sealing property, with reference to FIG. 4 and FIG. 5, one side of the second plate hole 71 in the backing plate 70 which faces the outer wall of the main accommodation body is designed to be in the shape of a countersink to form a second countersink 73 in which a second outer sealing ring 81 is embedded. By screwing the valve cap 41, a thrust surface 414 on the outer wall of the valve cap 41 acts on the backing plate 70 to cause the compressive deformation of a second inner sealing ring 62 and the second outer sealing ring 81 to realize sealing connection.

As shown in FIG. 4 and FIG. 5, the joint 51 is provided with a central hole 51, a squeezing surface 53, a threaded joint 52 (used as an internal connection part shown in this embodiment), a wrench position 54 and a cutting sleeve assembly 55 for external connection (used as an external connection part shown in this embodiment).

The threaded joint 52 passes through the first plate hole 72 in the backing plate 70 and the first connecting hole 22 in the pipe body 20, and then is connected to the first mounting hole 33 in the base 30, and the sealing of any two of the pipe body 20, the base 30, and the joint 50 at their intersection is realized through the first inner sealing ring 61 which is positioned on the first annular table 36 of the first mounting hole 33.

In order to further improve the sealing property, one side of the first plate hole 72 in the backing plate 70 which faces the outer wall of the main accommodation body is designed to be in the shape of a countersink to form the first countersink 74 in which the first outer sealing ring 82 is embedded.

When the joint 50 is screwed by the wrench position 54, the squeezing surface 53 acts on the backing plate 70 to cause the compressive deformation of the first inner sealing ring 61 and the first outer sealing ring 82 to realize the sealing connection.

Figure 3:
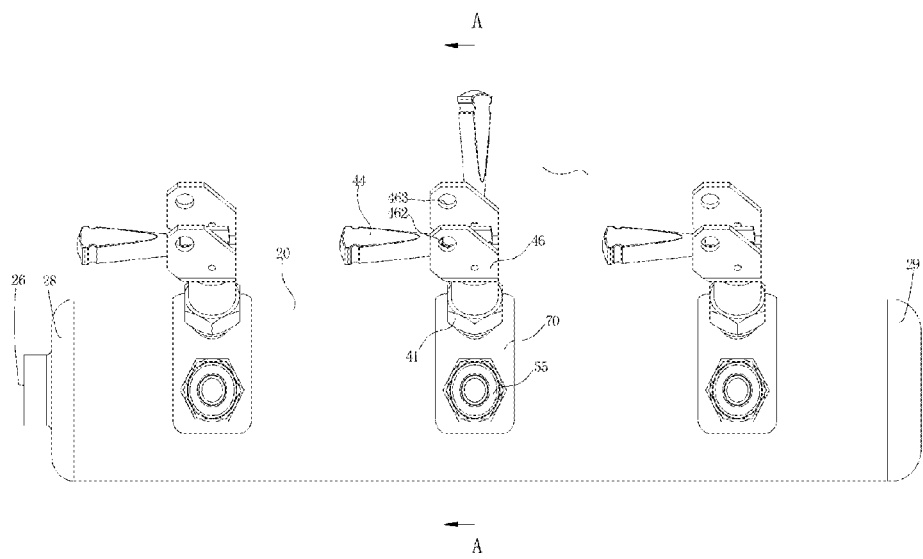
FIG. 3 is a front view of a branch pipeline control device.

FIG. 4 is a A-A sectional view of FIG. 3, which sectionally illustrates different operating states of two branch pipeline control devices of the fluid diversion device, with toggling of the handle to realize the on/off of the joint in the branch pipeline control device; left side refers to an on/circulation state, in which fluid can flow along an arrow direction or a direction opposite to the arrow direction, and right side refers to an off state.

In the production process, typically 6 branch pipeline control devices are firstly arranged on the pipe body 20, and then front end cover 29 and the rear end cover 28 are welded on the pipe body 20.

Certainly, in Embodiment 1, the internal connection part of the adopted square joint 50 extends into the first connecting hole 22 from the exterior of the main accommodation body to be linked with the first mounting hole 33 in a sealing manner; and one end 411 of the valve cap 41 passes through the second connecting hole 21 from the exterior of the main accommodation body to be fixed with the second mounting hole 32. But in other embodiments, it may also be that the first mounting hole 33 of the base 30 extends out of the first connecting hole 22 to be connected to the internal connection part in a sealing manner, allowing communication between the central hole and the base cavity; or the second mounting hole 32 extends out of the second connecting hole 21 to be fixed with the valve cap 41.

In addition, the matching of the valve cap 41, the joint 50 and the base 30 is that the valve cap 41 and the joint 50 have external threads, and the base 30 has internal threads; on the contrary, the valve cap 41 and the joint 50 can also be arranged to have the internal threads, and the base 30 can be arranged to have the external threads.

Embodiment 2

Embodiment 2 provides a fluid diversion device.

Figure 7:
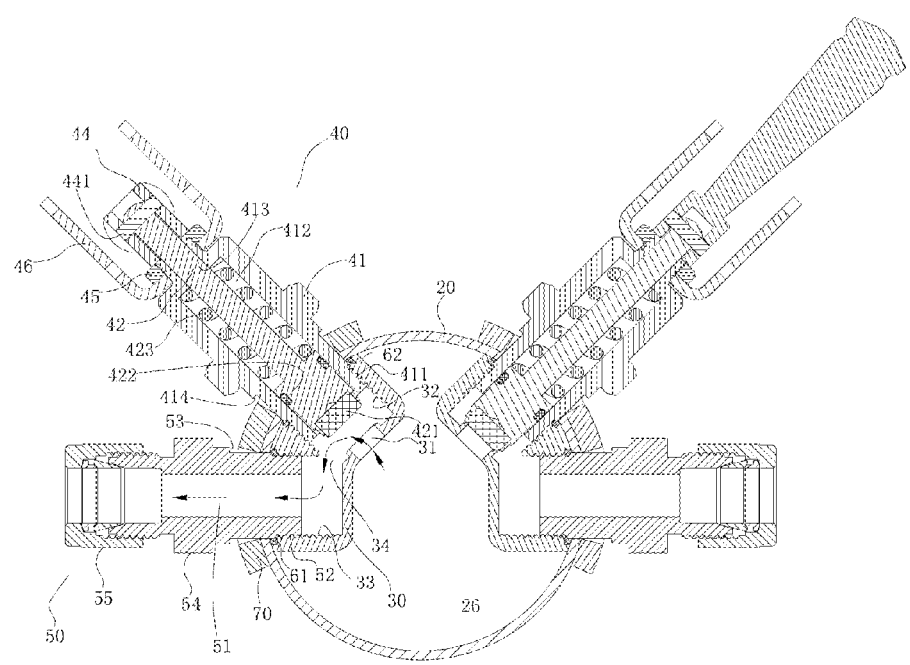
FIG. 7 is a structural view of Embodiment 2.

As shown in FIG. 7, the difference between the fluid diversion device in this embodiment and that in Embodiment 1 is that:

There's no counterbore shape arranged on the backing plate 70, therefore, despite the omission of the first outer sealing ring 82 and the second outer sealing ring 81 shown in Embodiment 1, the sealing for all components can also be achieved; and the backing plate 70 has the effects of reinforcing the pipe body and preventing the pipe body from deformation, and does not have the auxiliary sealing effect in Embodiment 1.

However, the main accommodation body is a pipe body with two through axial ends, without the front end cover 29 and the rear end cover 28 shown in FIG. 3 of Embodiment 1.

In use, the fluid diversion device is mounted by welding both ends of the pipe body on the pipeline.

Embodiment 3

Embodiment 3 provides a fluid diversion device.

Figure 8:
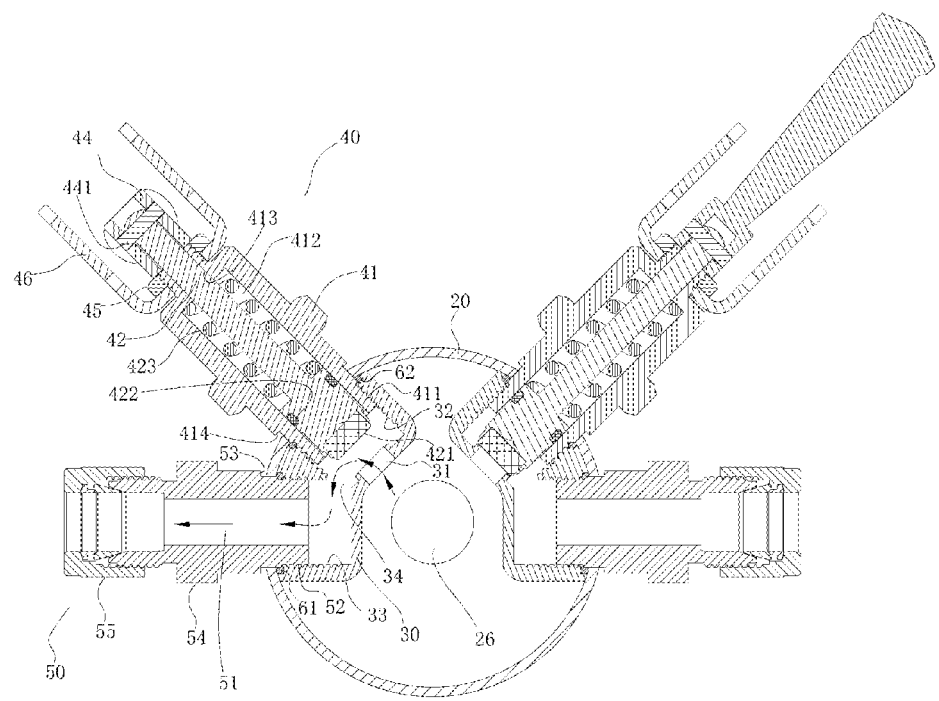
FIG. 8 is a structural view of Embodiment 3.

As shown in FIG. 8, the difference between the fluid diversion device provided in this embodiment and that in Embodiment 1 is that:

The backing plate 70, the first outer sealing ring 82, and the second outer sealing ring 81 in Embodiment 1 are omitted, if the sealing effect at the first inner sealing ring 61 and the second inner sealing ring 62 is excellent enough, the sealing for all the components can be achieved.

Embodiment 4

Embodiment 4 provides a fluid diversion device.

Figure 9:
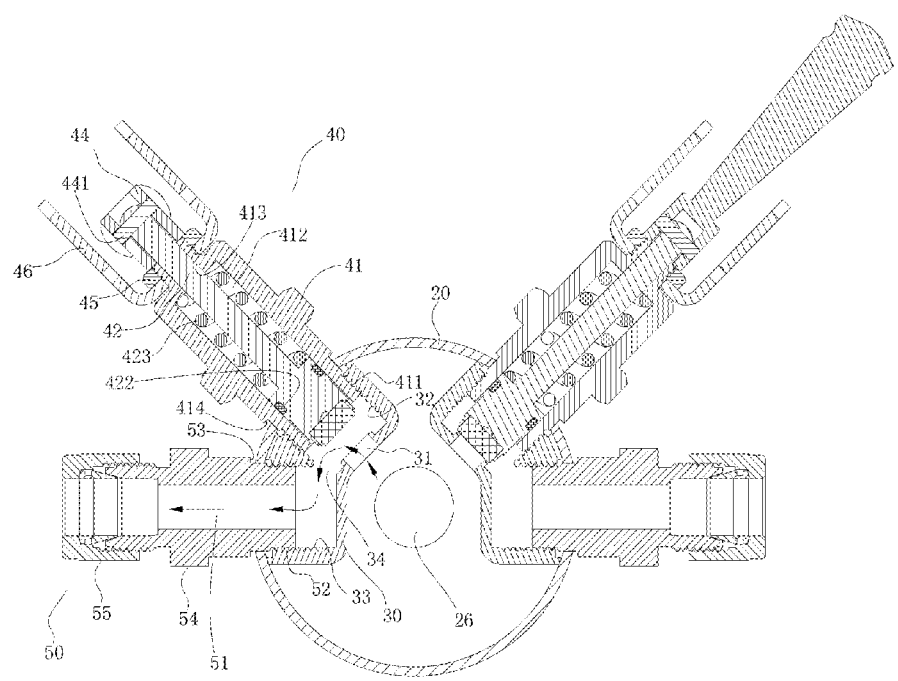
FIG. 9 is a structural view of Embodiment 4.

As shown in FIG. 9, the difference between the fluid diversion device provided in this embodiment and that in Embodiment 1 is that:

Experiments prove that, the sealing connection can be achieved by optimizing the precision of the base 30, the valve cap 41 and the joint 50. Therefore, the backing plate 70, the first outer sealing ring 82, the second outer sealing ring 81, the first inner sealing ring 61, and the second inner sealing ring 62 in Embodiment 1 can be omitted in Embodiment 4 completely.

Further, in order to enhance sealing, generally the intersection of the valve cap, the base and the main accommodation body can be coated with a sealant for sealing; and the intersection of the joint, the base and the main accommodation body can be coated with the sealant for sealing.

Embodiment 5

Embodiment 5 provides a fluid diversion device.

Figure 10:
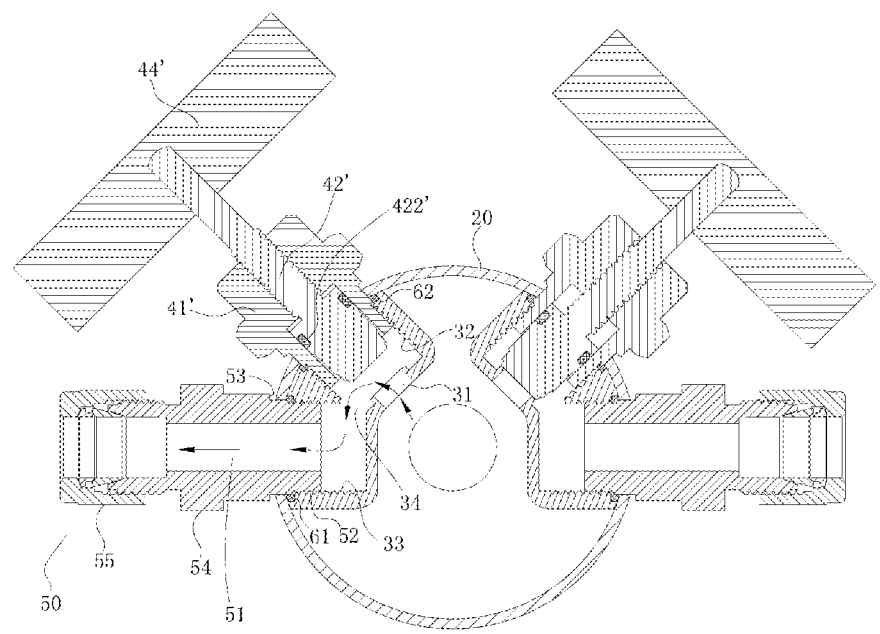
FIG. 10 is a structural view of Embodiment 5.

As shown in FIG. 10, the difference between the fluid diversion device provided in this embodiment and that in Embodiment 3 is that:

the driving modes of the valve rod are different, and in particular, the valve core assembly comprises a valve rod 42' and an O-shaped ring 422', and the connection sealing mode between the valve cap 41' and the base 30 is the same as that shown between the valve cap 41 and the base 30 in Embodiment 3. The valve cap 41' has a section of internal thread hole communicated with the central cavity, and the valve rod 42' is screwed in the internal thread hole of the valve cap 41', and through the rotation of the handle 44', the on/off state of the flow passage opening 31 is controlled by adjusting the position of the valve rod 42'.

Further, the backing plate 70, the first outer sealing ring 82, and the second outer sealing ring 81 in Embodiment 1 can be omitted in this embodiment to simplify the structure.

In the present invention, a container can be of multiple specific structures, such as a bottle structure having only one main passage, or even only in the form of using the pipe body in Embodiment 2; for the valve cap assembly, reference to various structures of existing valves, such as a needle valve, ball valve, etc., has been made, for example, a ball valve structure disclosed by U.S. Pat. No. 8,186,371B, is applicable to the present invention, as long as being installed on the outer side of the pipe body to realize the on/off of the passage between the base cavity and the interior of the pipe body; and the base of the present invention can be machined in various ways, such as casting, an integral structure is adopted for the base in the above embodiment, and a combined structure formed by the connection of a plurality of parts can also be adopted.

The above content is a further detailed description of the present invention in conjunction with the specific implementation manners, and it should not be considered the present invention is only limited to the implementation manners specifically described herein. It will be appreciated by those ordinarily skilled in the art that various simple deduction and substitutions may be made to the invention without departing from the concept of the invention.

What is claimed is:

1. A fluid diversion device, comprising:
   a main accommodation body, comprising an accommodation cavity; and
   at least one branch pipeline control device mounted on the main accommodation body, the branch pipeline control device comprising:
   a base, comprising a base cavity in which a flow passage opening for being communicated with the main accommodation body in a sealing manner and a first mounting hole and a second mounting hole for being communicated with the branch pipeline are arranged;
   a valve cap assembly, comprising a valve cap provided with a central cavity, a valve core assembly for controlling on/off of the flow passage opening and a driving part for driving movement of the valve core assembly, the valve cap being linked with the base in a sealing manner through the second mounting hole; the valve core assembly comprising a valve rod, the valve rod being provided through the central cavity and extending out of the valve cap to be connected to the driving part, and driven by the driving part to open and close the flow passage opening; and a joint, having a central hole, an internal connection part for being connected to the first mounting hole and an external connection part for external connection, the internal connection part being connected to the first mounting hole in a sealing manner.

2. The fluid diversion device according to claim 1, wherein the base is fixedly arranged inside the main accommodation body, the valve cap assembly and the joint are fixedly arranged outside the main accommodation body, and the main accommodation body is provided with a first connecting hole corresponding to the first mounting hole and a second connecting hole corresponding to the second mounting hole; the internal connection part extends into the first connecting hole from the exterior of the main accommodation body to be linked with the first mounting hole in a sealing manner, or the first mounting hole of the base extends out from the first connecting hole to be linked with the internal connection part in a sealing manner, allowing communication between the central hole and the base cavity; and one end of the valve cap passes through the second connecting hole from the exterior of the main accommodation body to be fixed with the second mounting hole, or the second mounting hole extends out from the second connecting hole to be fixed with the valve cap.

3. The fluid diversion device according to claim 2, wherein the valve cap and the internal connection part have external threads, the part of the internal connection part which has the external threads passes through the first connecting hole to be in threaded connection with the first mounting hole, the part of the valve cap which has the external threads passes through the second connecting hole to be in threaded connection with the second mounting hole, and the base, the valve cap and the joint abut against the main accommodation body from both inner and outer sides of the main accommodation body for fixation.

4. The fluid diversion device according to claim 2, wherein the driving part is a handle connected to a valve rod by a pin shaft, the handle abuts against one end of the valve cap away from the base, an outer edge of the handle for abutting against the valve cap has a first outer edge portion and a second outer edge portion, the distance from the first outer edge portion to the pin shaft is greater than that from the second outer edge portion to the pin shaft, the valve core assembly comprises a spring disposed between the inner wall of the central cavity and the valve rod, and the resilience of the spring drives the valve rod to move towards the flow passage opening; when the first outer edge portion on the handle abuts against the valve cap, the valve rod opens the flow passage opening; and when the second outer edge portion on the handle abuts against the valve cap, the valve rod closes the flow passage opening.

5. The fluid diversion device according to claim 4, wherein the valve cap and the internal connection part have external threads, the part of the internal connection part which has the external threads passes through the first connecting hole to be in threaded connection with the first mounting hole, the part of the valve cap which has the external threads passes through the second connecting hole to be in threaded connection with the second mounting hole, and the base, the valve cap and the joint abut against the main accommodation body from both inner and outer sides of the main accommodation body for fixation.

6. The fluid diversion device according to claim 4, wherein the valve cap assembly also comprises a lock bracket fixedly linked with the valve cap, the lock bracket has a blocker for blocking the rotation of the handle, and the blocker is positioned on a rotation path of the handle and detachably mounted on the lock bracket.

7. The fluid diversion device according to claim 6, wherein the valve cap and the internal connection part have external threads, the part of the internal connection part which has the external threads passes through the first connecting hole to be in threaded connection with the first mounting hole, the part of the valve cap which has the external threads passes through the second connecting hole to be in threaded connection with the second mounting hole, and the base, the valve cap and the joint abut against the main accommodation body from both inner and outer sides of the main accommodation body for fixation.

8. The fluid diversion device according to claim 1, wherein the central cavity is of a diameter reducing structure which has a small-diameter end and a large-diameter end, and the valve rod passes through the small-diameter end and extends out of the valve cap to be connected to the driving part.

9. The fluid diversion device according to claim 8, wherein the valve cap and the internal connection part have external threads, the part of the internal connection part which has the external threads passes through the first connecting hole to be in threaded connection with the first mounting hole, the part of the valve cap which has the external threads passes through the second connecting hole to be in threaded connection with the second mounting hole, and the base, the valve cap and the joint abut against the main accommodation body from both inner and outer sides of the main accommodation body for fixation.

10. The fluid diversion device according to claim 1, wherein the valve cap and the internal connection part have external threads, the part of the internal connection part which has the external threads passes through the first connecting hole to be in threaded connection with the first mounting hole, the part of the valve cap which has the external threads passes through the second connecting hole to be in threaded connection with the second mounting hole, and the base, the valve cap and the joint abut against the main accommodation body from both inner and outer sides of the main accommodation body for fixation.

11. The fluid diversion device according to claim 10, wherein the intersection of the valve cap, the base and the main accommodation body is provided with a sealing ring and/or coated with a sealant for sealing.

12. The fluid diversion device according to claim 10, wherein the intersection of the joint, the base and the main accommodation body is provided with a sealing ring and/or coated with a sealant for sealing.

13. The fluid diversion device according to claim 10, wherein the branch pipeline control device also comprises a backing plate which has a first plate hole corresponding to the first connecting hole and a second plate hole corresponding to the second connecting hole, the backing plate is compressed on the outer wall of the main accommodation body via the valve cap and the joint, and the sides of the first plate hole and the second plate hole which face the outer wall of the main accommodation body are designed to be in the shape of countersinks, and a first outer sealing ring and a second outer sealing ring are arranged in the countersinks.

14. The fluid diversion device according to claim 1, wherein the branch pipeline control device also comprises a backing plate which has a first plate hole corresponding to the first connecting hole and a second plate hole corresponding to the second connecting hole, and the baking plate is compressed on the outer wall of the main accommodation body via the valve cap and the joint.

15. The fluid diversion device according to claim 1, wherein one end of the valve rod proximate to the flow passage opening is embedded with a valve head for improving the sealing property of the flow passage opening.

* * * * *